F. C. PRINDLE.
TILTING STEERING WHEEL FOR MOTOR VEHICLES.
APPLICATION FILED SEPT. 21, 1917.
Reissued July 8, 1919. 14,684.
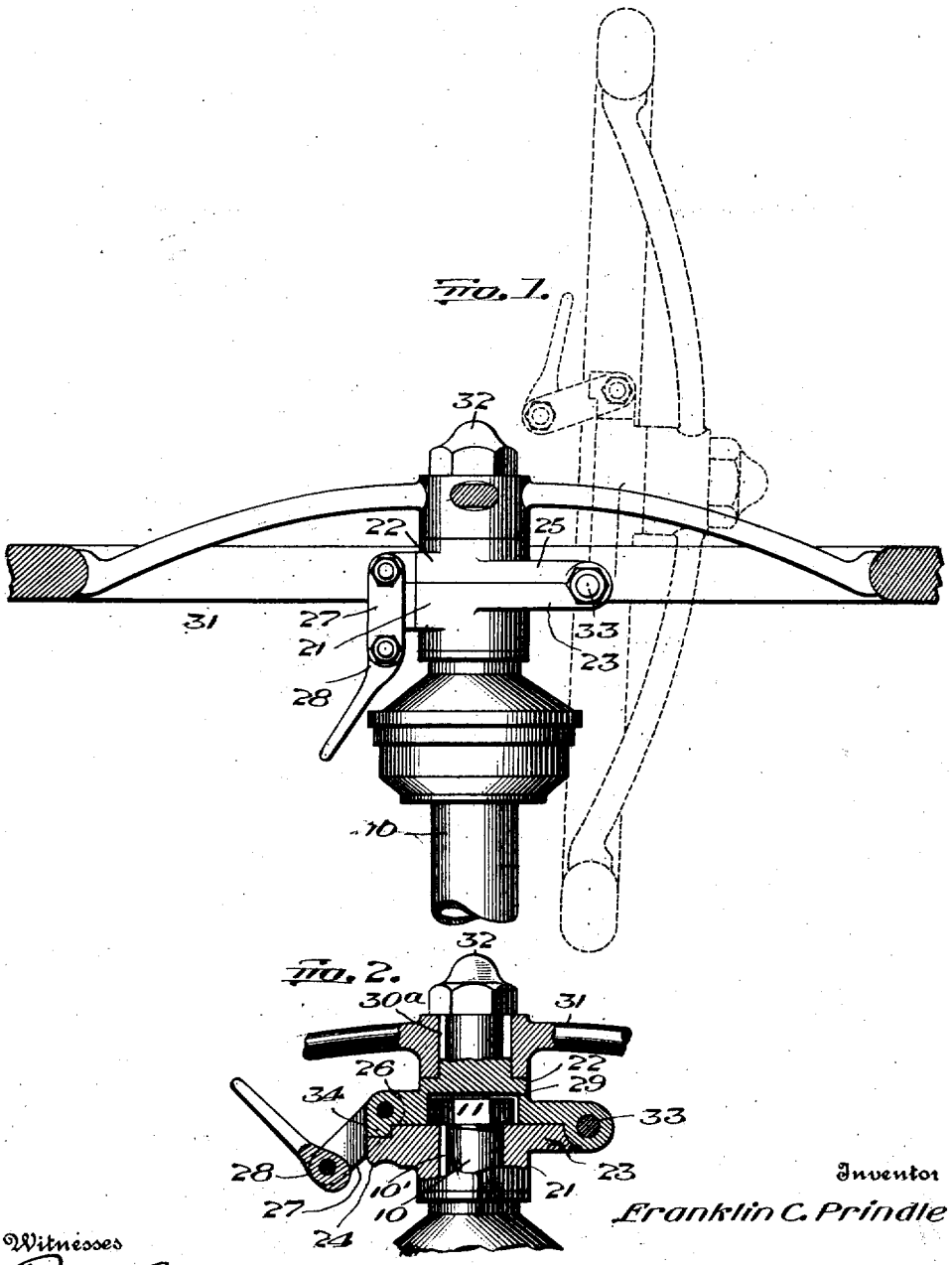
Witnesses
Philip E. Barnes
Inventor
Franklin C. Prindle
By Hood & Schley
Attorneys

UNITED STATES PATENT OFFICE.

FRANKLIN C. PRINDLE, OF WASHINGTON, DISTRICT OF COLUMBIA, ASSIGNOR TO CHESTER RICKER, OF INDIANAPOLIS, INDIANA.

TILTING STEERING-WHEEL FOR MOTOR-VEHICLES.

14,684. Specification of Reissued Letters Patent. Reissued July 8, 1919.

Original No. 1,098,301, dated May 26, 1914, Serial No. 768,560, filed May 19, 1913. Application for reissue filed September 21, 1917. Serial No. 192,612.

*To all whom it may concern:*

Be it known that I, FRANKLIN C. PRINDLE, a citizen of the United States, residing at Washington, in the District of Columbia, have invented new and useful Improvements in Tilting Steering-Wheels for Motor-Vehicles, of which the following is a specification.

In the construction and arrangement of that particular type of steering-mechanism for motor-vehicles or automobiles employing a steering-wheel the latter is usually disposed in close proximity to the seat, to be within easy reach of the operator for steering the vehicle, but when so disposed is in the way of the operator getting on or off the seat, practically necessitating the employment of some means by which the steering-wheel may be shifted or tilted out of the way temporarily.

In the present instance I accomplish the tilting of the steering-wheel by means of a peculiar form of hinge-connection and locking insert, and the primary object of my invention is to provide an improved hinge-connection and locking device of simple construction for convenient insertion and manipulation, and also strong and durable to insure a proper operation of the steering mechanism when the wheel is in locked engagement with the post.

Other objects and advantages of the invention will hereinafter appear, and what I claim as new and desire to secure by Letters Patent is specifically pointed out in the appended claims.

In the accompanying drawings, forming a part hereof, Figure 1 is a side elevation of the steering-wheel and post of a steering-mechanism for motor-vehicles, part of the wheel being broken away to show the hinge-connection and locking device. Fig. 2 is a detail sectional view through the hinge-connection and locking device.

At the outset it will be understood that my invention is applicable to that type of steering-mechanism in which the spark and throttle levers are located below the steering-wheel, thereby not interfering with the tilting movement of the wheel, such an arrangement being common to that type of automobile known as the "Ford," to which my invention is particularly adapted; although of course it may be applied to any type of steering-mechanism permitting a tilting movement of the wheel away from the upper end of the post.

In carrying out my invention I provide two similar hinge-members 21, and 22, in which the member 21 is provided with a short arm 23, opposite the locking lug 24, and the hinge-member 22 provided with a similar short arm 24, and opposite locking-lug 26, coöperating with the lug 24. The links 27, 27 are pivoted to the lug 26 and adapted to embrace the lug 24. Pivoted between the ends of links 27 is a locking cam 28 which may enter the recess 35 at the underside of the last-mentioned lug. The hinge-member 22 is provided with a socket 29, to receive the head-nut 11 by which the member 21 is secured to the upper end of the steering-post 10, and with an upwardly-projecting stud 30 to receive the steering-wheel 31, secured thereon by a cap-nut 32. To prevent the wheel turning on the stud the latter is provided with splines $30^a$, which enter the already formed ways in the hub of the steering-wheel, and the member 21 is provided with ways to receive the existing splines 10′ on post 10.

To relieve the hinge-members 21 and 22 from lateral movement or strain on the pintle or bolt 33, one of said hinge-members, as 22, is provided with a tongue 34, seating in a corresponding recess in the other hinge-member, as shown in Fig. 2.

It will be seen that my invention may be produced as a separate article of manufacture at small cost and that any ordinary user of a car of the type specified, may very easily insert my device between the steering-post and steering-wheel and thus obtain, for a small sum and without discard of any parts, all the advantages of a tilting steering-wheel.

I claim as my invention:—

1. As an article of manufacture, an insert for automobile steering gear, comprising two members hinged together, one provided with a key-way bore to receive the spline of the steering post, and the other carrying a splined stud to receive the key-way bore of the steering wheel, and also comprising a locking device for locking the two hinged members together and thereby adapted to hold the steering wheel in active position.

2. As an article of manufacture, an insert for automobile steering gear, comprising two members hinged together, one provided with a key-way bore to receive the spline of the steering post, and the other carrying a splined stud to receive the key-way bore of a steering wheel, said two members having mating projections, a link carried by one member and formed to straddle the projection of the other member, and a locking cam carried by said link.

3. As an article of manufacture, an insert for automobile steering gear, comprising two members hinged together, one provided with a key-way bore to receive the spline of the steering post, and the other carrying a splined stud to receive the key-way bore of a steering wheel, one of said members being recessed in its face adjacent the other member to form a pocket for a holding nut on the end of the steering post, and also comprising a locking device for locking the two hinged members together and thereby adapted to hold the steering wheel in active position.

FRANKLIN C. PRINDLE.